United States Patent [19]
Hayward

[11] Patent Number: 5,848,952
[45] Date of Patent: Dec. 15, 1998

[54] GEAR DEPENDENT MANUAL MODULATION TRANSMISSION CONTROL STRATEGY

[75] Inventor: Randy R. Hayward, Mapleton, Ill.

[73] Assignee: Caterpillar Inc., Peoria, Ill.

[21] Appl. No.: 811,091

[22] Filed: Mar. 3, 1997

[51] Int. Cl.⁶ .............................. B60K 41/28; B60K 41/18
[52] U.S. Cl. .................. 477/116; 477/117; 74/732.1; 74/335
[58] Field of Search ................................ 74/335, 336 R, 74/732.1; 477/116, 117, 156, 158

[56] References Cited

U.S. PATENT DOCUMENTS

| | | | |
|---|---|---|---|
| 4,678,069 | 7/1987 | Yoshimura et al. | 192/0.033 |
| 4,982,622 | 1/1991 | Yamamoto et al. | 477/117 |
| 5,069,084 | 12/1991 | Matsuno et al. | 74/844 |
| 5,438,887 | 8/1995 | Simmons | 74/335 |
| 5,450,768 | 9/1995 | Bulgrien et al. | 74/336 R |
| 5,520,593 | 5/1996 | Yesel et al. | 477/77 |
| 5,587,905 | 12/1996 | Yesel et al. | 364/424 |

*Primary Examiner*—Khoi Q. Ta
*Attorney, Agent, or Firm*—J. W. Burrows

[57] ABSTRACT

A gear dependent manual modulation transmission control strategy is provided in a machine having an inching control arrangement so that during inching control operation the pressure of the fluid being directed to the selected clutches verses the displacement of the inching pedal can be changed relative to the selected gear ratio. This is accomplished by disposing a solenoid actuated manual modulation valve between a source of pressurized fluid and certain ones of the fluid actuated clutches and a controller operating to change the pressure relationship by changing the magnitude of the signal to the solenoid actuated manual modulation valve upon receiving a signal from a shift lever indicating a different pre-selected gear ratio.

3 Claims, 4 Drawing Sheets

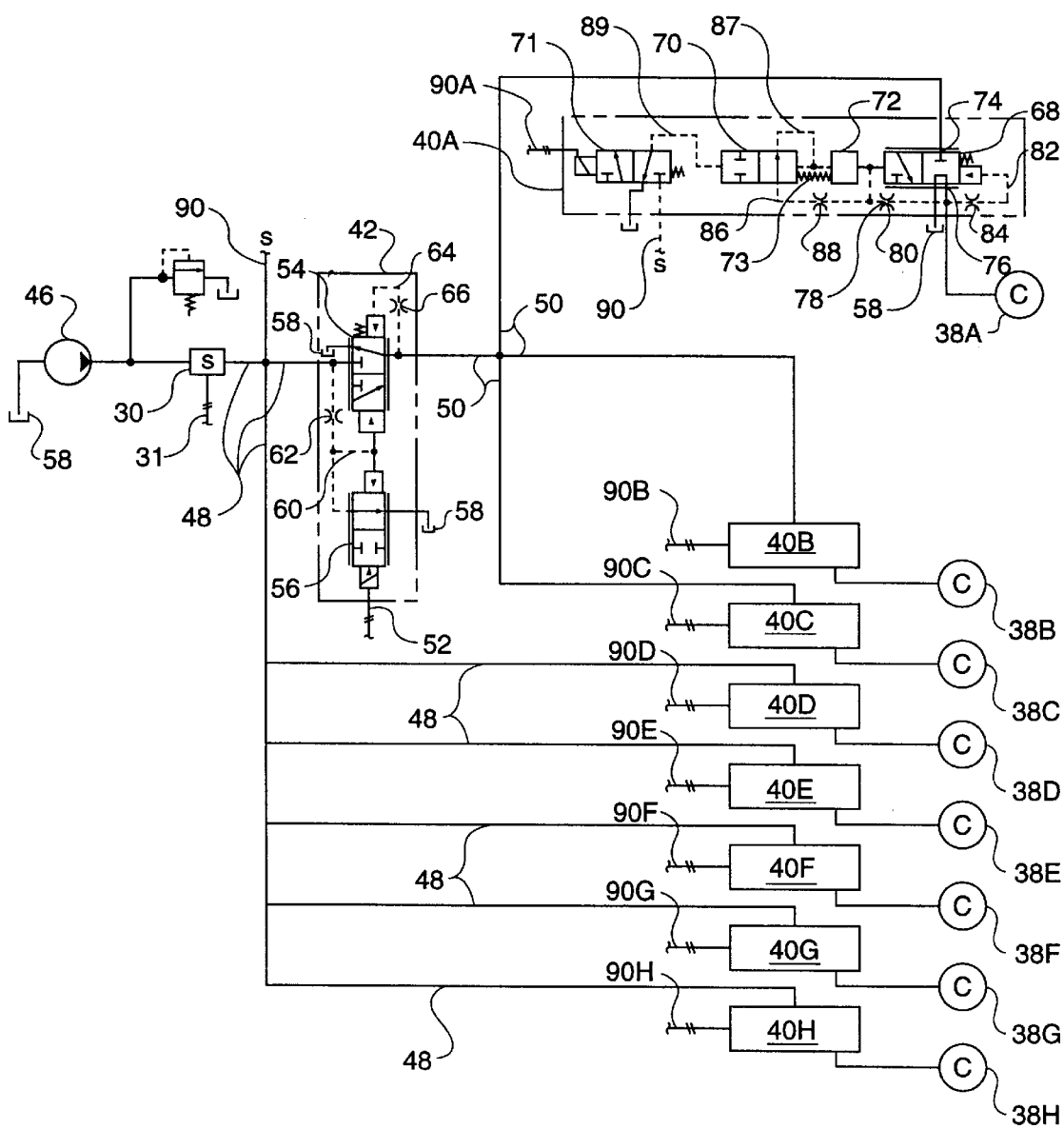

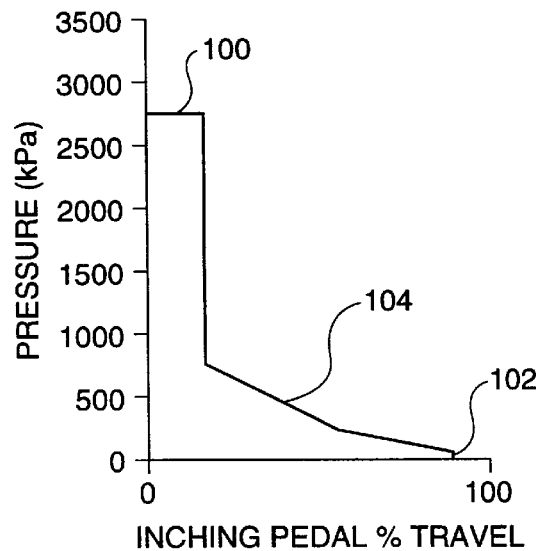
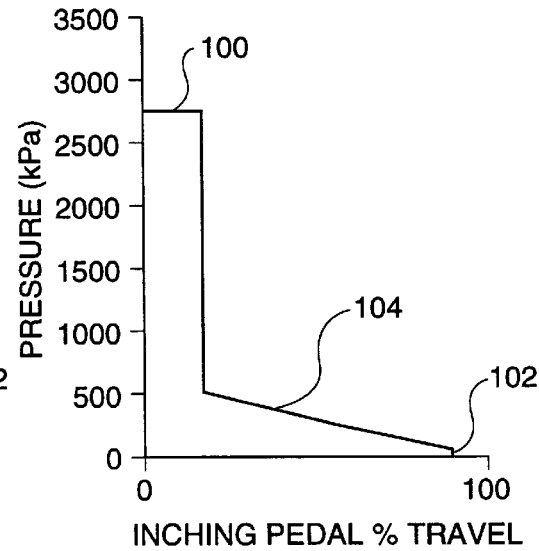
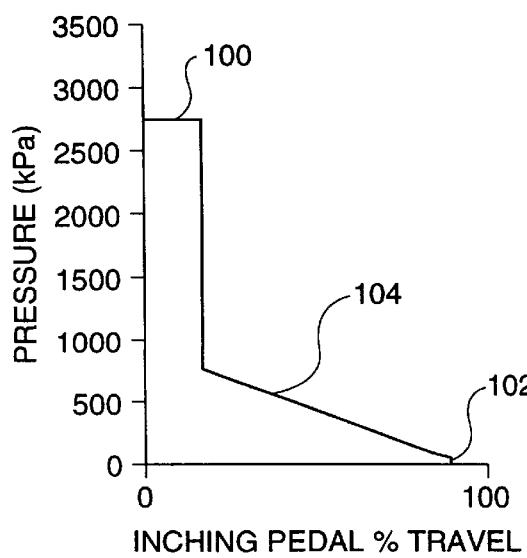
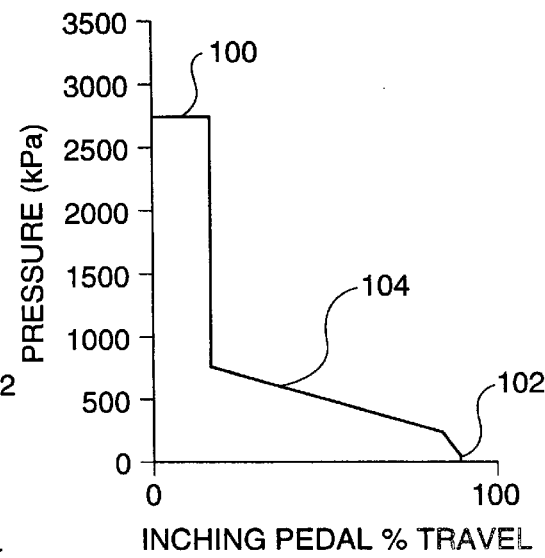

GEAR DEPENDENT MANUAL MODULATION TRANSMISSION CONTROL STRATEGY

TECHNICAL FIELD

The present invention relates to generally to a transmission control strategy and more particularly to a gear dependent manual modulation transmission control strategy for use in a machine that uses a manual modulation valve or inching valve while being operated in its various gear ratios.

BACKGROUND OF THE INVENTION

Automatic transmissions are used in many machines and provide many advantages to the operator during normal work. In machines used today, such as motorgraders, there are many different gear ratios that are each provided by engaging certain ones of a plurality of fluid actuated clutches. These clutches are normally engaged by directing pressurized fluid through respective pressure modulation valves that are likewise controlled by solenoid actuated valves. The solenoid actuated valves are controlled in response to receipt of an electrical signal received from a controller. Many times it is desirable to stop or slow the machine without changing the current gear ratio in the transmission. It has been known to use an operator controlled manual modulation that is controlled by the operator depressing a foot pedal. The degree of depression of the foot pedal determines the magnitude of the pressure acting on the engaged clutches. In these known systems, the relationship of the percent of pedal depression to the magnitude of pressure acting on the engaged clutches is the same for all gear ratios. It is desirable to have a different relationship for at least some of the different gear ratios.

The present invention is directed to overcoming one or more of the problems set forth above.

DISCLOSURE OF THE INVENTION

In one aspect of the present invention, a gear dependent control arrangement is provided and adapted for use in a machine having a source of pressurized fluid, a shift lever movable to various positions and operative to provide a signal representative of the desired gear ratio, a transmission with a plurality of fluid actuated clutches, and a transmission control system having a solenoid operated pressure modulation valve disposed between each of the clutches and the source of pressurized fluid, and a controller operative to receive the signal from the shift lever and control the respective solenoid operated pressure modulation valves to obtain the desired gear ratio. The gear dependent control arrangement includes a solenoid actuated manual modulation valve disposed between the source of pressurized fluid and at least certain ones of the plurality of solenoid operated pressure modulation valves, an operator control mechanism connected to the controller and operative to direct a signal to the controller representative of the position of the operator control mechanism, and the controller being operative to change the magnitude of the pressurized fluid being directed to the certain ones of the solenoid actuated pressure modulation valves from the solenoid actuated manual modulation valve relative to the displacement of the operator control mechanism in response to changing the selected gear ratio.

These and other aspects, objects, features and advantages of the present invention will be more clearly understood and appreciated from a review of the following detailed description of the preferred embodiments and appended claims, and by the accompanying drawings.

BRIEF DESCRIPTION OF THE DRAWINGS

FIG. 3 is a schematic representation of a portion of the subject invention;

FIG. 4 is a chart representing clutch pressure verses percent of inching pedal travel;

FIG. 5 is another chart representing clutch pressure verses percent of inching pedal travel;

FIG. 6 is another chart representing clutch pressure verses percent of inching pedal travel; and FIG. 7 is another chart representing clutch pressure verses percent of inching pedal travel.

BEST MODE FOR CARRYING OUT THE INVENTION

Figure 1:
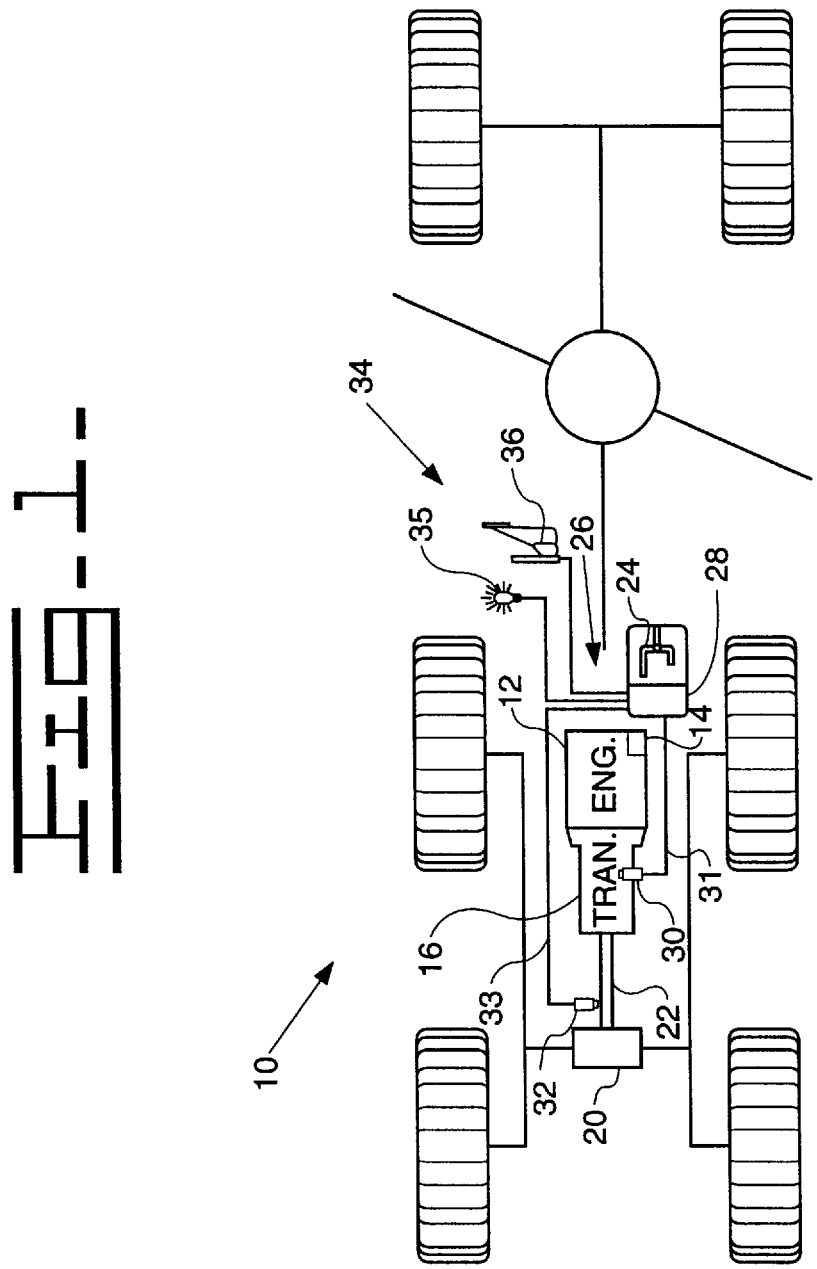
FIG. 1 is a diagrammatic representation of a machine incorporating an embodiment of the present invention.
Figure 2:
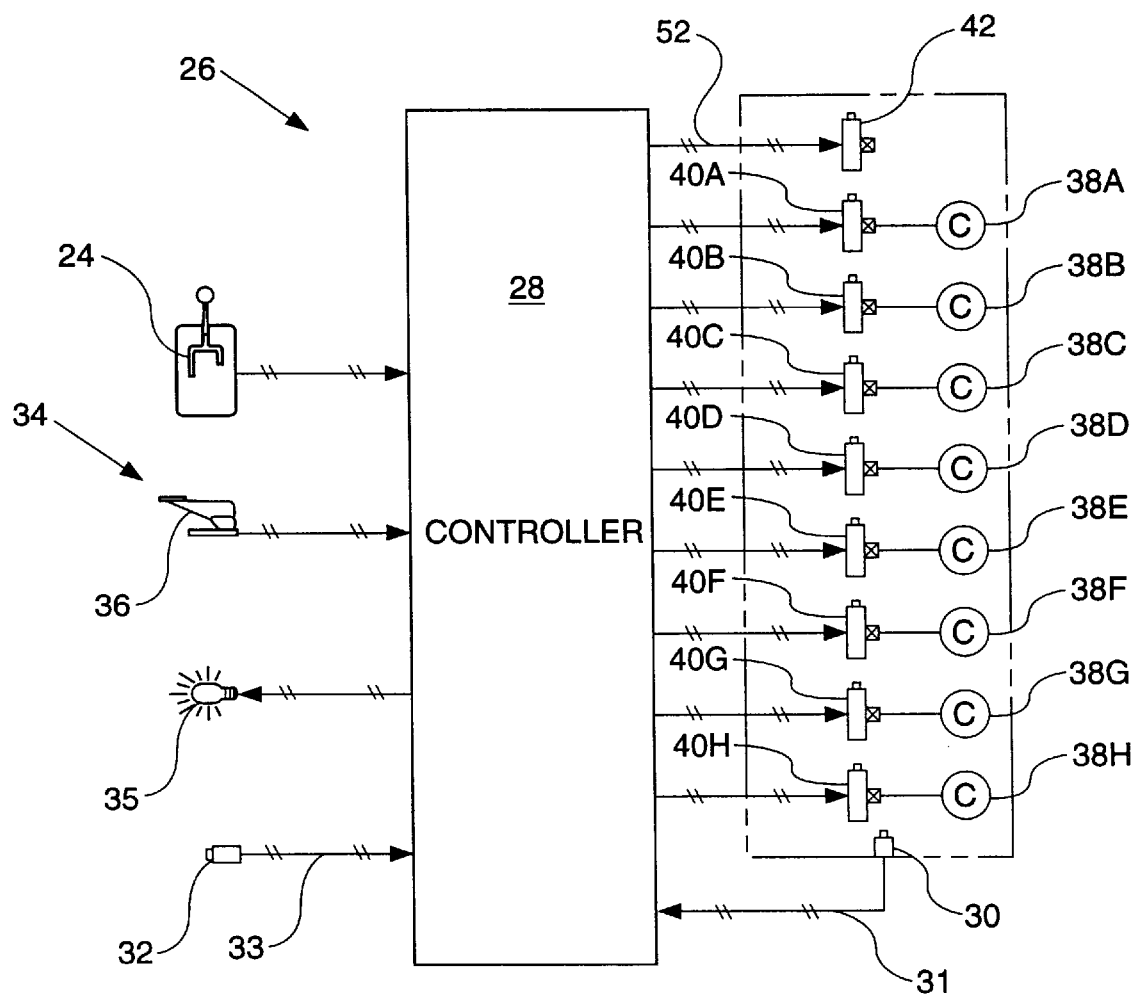
FIG. 2 is a partial diagrammatic and a partial schematic representation of a transmission control arrangement.

Referring to FIG. 1–2, a machine 10, such as a motor grader, has an engine 12 with an engine throttle control 14 for controlling the engine speed. A transmission 16 is operatively connected to the engine 12 and coupled to a differential gearing 20 by a shaft 22. The transmission output is measured in terms of the speed of rotation of its output shaft 22 in rpm. The transmission 16 of the subject disclosure is an automatic transmission, but it is recognized that other types of fluid drive transmissions could be used. A shift lever 24 is associated with the transmission 16 for shifting the transmission from the park position to the neutral position and then between its various forward and reverse gear ratios. In the subject machine, there are eight forward gear ratios and six reverse gear ratios. It is recognized that other numbers of gear ratios could be utilized without departing from the essence of the subject invention.

The transmission 16 has a control system 26 that includes a controller 28 that is operative to receive various system parameters and control the transmission in response to the system parameters. The control system 26 further includes an oil operating condition sensor 30 that may be in the form of a temperature sensor or a viscosity sensor. The oil operating condition sensor 30 delivers a signal to the controller 28 through an electrical line 31 that is representative of the operating condition of the oil in the transmission 16.

A speed sensor 32 is operatively associated with the transmission output shaft 22 and operative to deliver a signal through an electrical line 33 to the controller 28 that is representative of the speed of the output shaft 22. The machine 10 also includes an operator control mechanism 34 that is operatively associated with the controller 28 and includes a foot pedal 36 that is movable from a 0% percent travel position toward a 100% travel position in response to the operator's desired input. A lamp indicator 35 is operatively associated with the controller 28 and operative to indicate that the transmission is not operating at its normal operating level.

As more clearly illustrated in FIG. 2, the transmission 16 includes a plurality of fluid actuated clutches 38A–H and the transmission control system 26 includes a plurality of pressure modulation valves 40A–H operatively connected to the plurality of fluid actuated clutches 38A–H. In the subject embodiment, the pressure modulation valves 40A–H are each solenoid actuated valves. The transmission control system 26 also includes a solenoid actuated manual modulation valve 42 that is operatively associated with the controller 28 and controlled in response to movement of the foot pedal 36.

The shift lever 24 is a multi-contact switch that sends position information to the controller 28 to indicate the desired direction of travel and the desired gear ratio for the transmission 16. When the transmission speed, as indicated by the speed sensor 32, and the engine speed permit a shift to the desired gear, the controller 28 sends the appropriate signals to the transmission control system 26 to provide the selected direction and gear ratio. As is known in the art, the appropriate solenoid actuated pressure modulation valves 40A–H operate the corresponding fluid actuated clutches 38A–H and thereby determine the actual travel and gear ratio of the transmission 16.

Referring to FIG. 3, the schematic illustrates that the machine 10 includes a source of pressurized fluid 46 that is operatively connected to the plurality of solenoid actuated pressure modulation valves 40A–H and the solenoid actuated manual modulation valve 42. More specifically, the source of pressurized fluid 46 is connected in parallel to the manual modulation valve 42 and the pressure modulation valves 40D–H by a supply conduit 48. The pressure modulation valves 40A–C are connected to the manual modulation valve 42 through a second supply conduit 50. The oil operating condition sensor 30 is disposed in the supply conduit 48 upstream of the respective manual modulation valve 42 and the plurality of pressure modulation valves 40A–H and delivers an electrical signal to the controller 28 through the electrical line 31. Even though the oil operating condition sensor 30 is illustrated as being in the supply conduit 48, it is recognized that it could be located in other areas of the hydraulic system, such as, in one of the drain lines associated with one of the modulation valves or in one of the pilot lines of the manual modulation valve 42.

The manual modulation valve 42 is a proportional valve that control the magnitude of pressure that is provided downstream thereof to the second supply conduit 50 in response to the magnitude of the electrical signal received from the controller 28 through an electrical line 52. The manual modulation valve 42 general includes a two-position, three-way pilot operated valve 54 and a two-position, two-way solenoid actuated valve 56. The pilot operated valve 54 is spring biased to a first position at which the second conduit 50 is in open communication with a reservoir 58 and the first supply conduit 48 is blocked. The pilot operated valve 54 is movable towards the second position at which the first conduit 48 is in fluid communication with the second supply conduit 50 and the reservoir 58 is blocked. The pilot operated valve 54 is movable towards the second position in response to pressurized fluid in a pilot conduit 60 that is in communication with the first supply conduit 48 through an orifice 62. The pilot operated valve 54 is also urged towards its first position by the force of the pressurized fluid in a conduit 64 that is in communication with the second supply conduit 50 through an orifice 66.

The solenoid actuated valve 56 is biased to its first position by the force of the pressurized fluid in the pilot conduit 60 at which the pilot conduit 60 is in open communication with the reservoir 58 and movable towards its second blocking position in response to the electrical signal received from the controller 28 through the electrical line 52.

Each of the pressure modulation valves 40A–H are of the same construction and only one of them will be described in detail. The schematic representation illustrated in FIG. 3 is only a general representation of the pressure modulation valves and the hydraulic system. The only significant difference between the schematic representation and the diagrammatic representation is that the respective solenoid valves receive pressurized fluid from the source of pressurized fluid 46 and each solenoid valve has a flow inhibitor that prohibits flow to certain other ones of the solenoid valves when the solenoid is energized.

Each of the pressure modulation valves 40A–H includes a two-position, three-way pilot operated valve 68, a two-position, two-way pilot operated valve 70, a two-position solenoid operated valve 71, a load piston 72 and a spring 73 disposed between one end of the two-way pilot operated valve 70 and the load piston 72. An inlet 74 to the pilot operated valve 68 is connected to the appropriate supply conduit 48/50 and an outlet 76 thereof is connected to the respective fluid actuated clutches 38A–H. The pilot operated three-way valve 68 is spring biased to a first position at which the inlet 74 is blocked and the outlet 76 is in open communication with the reservoir 58. The pilot operated three-way valve 68 is movable towards the second position at which the inlet 74 is in open communication with the outlet 76 and the reservoir 58 is blocked. The pressurized fluid in a pilot conduit 78 that is connected to the pressurized fluid in the outlet 76 through an orifice 80 acts to bias the pilot operated three-way valve 68 towards its second position. The pilot operated three-way valve 68 is urged towards its first position in response to the pressurized fluid in a pilot conduit 82 that is connected to the pressurized fluid in the outlet 76 through an orifice 84.

The spring 73 biases the two-way pilot operated valve 70 towards a first position at which a conduit 86 is in open communication to an area within the spring chamber 73 through a conduit 87. The conduit 86 is connected to the conduit 78 through an orifice 88. The pressurized fluid in the conduit 78 also acts on the load piston 72 and is effective to increase the load on the spring 73. The two-way pilot operated valve 70 is movable towards its second position in response to receipt of pressurized fluid through a conduit 89 from the solenoid operated valve 71. The solenoid operated valve 71 is spring biased to a first position at which pressurized fluid in the conduit 89 is in communication with the reservoir 58. The solenoid operated valve 71 is movable towards its second position in response to electrical signal from the controller 28 through respective electrical lines 90A–H. With the solenoid operated valve 71 in its second position, the source of pressurized fluid 46 is in communication through conduits 90,89 with the end of the two-way pilot operated valve 71 that is opposite the spring 73.

Referring to FIG. 4, a chart is illustrated and sets forth a curve that represents the typical pressure that being subjected to the pressure modulation valves 40A–C versus the position of the foot pedal 36 of the operator control mechanism 34. The vertical axis represents the pressure in kPa and the horizontal axis represents the percent of displacement of the foot pedal. With the foot pedal 36 fully released, the pressure of the fluid being directed through the manual modulation valve 42 is at its predetermined maximum level as indicated by the horizontal line 100. The short vertical line 102 represents the point of foot pedal travel at which the pressurized fluid through the manual modulation valve 42 is zero. The sloped line 104 that is interconnected between the horizontal line 100 and the shot vertical line 102 is a typical relationship that has been used in the past that is a compromise relationship for use in the various gear ratios. The chart is a representation of a look-up table that the controller 28 uses as a reference during use of the foot pedal 36. The look-up table has a series of pressures that relate to the percent of travel of the foot pedal. With a given percent of displacement of the foot pedal 36, the controller 28 directs an electrical signal representative thereof to the manual modulation valve 42. The manual modulation valve 42 sets the outlet pressure to the supply conduit 50 to the level established in the look-up table.

Referring to FIG. 5, another chart is illustrated. The lines of this chart have the same element numbers of the lines in FIG. 4. This chart relates to a pressure versus percent of foot pedal travel for a particular number of gear ratios. In the subject chart, the gear ratios are for lower gears. It is recognized that a different chart could be established for each gear ratio. The line 104 has a different slope and shape of the line 104 in FIG. 4 and provides the control characteristics for operating the fluid actuated clutches 38A–C in the lower gear ratios.

FIG. 6 illustrates another chart. The lines of this chart also have the same element numbers of the lines in FIG. 4. This chart relates to a pressure versus percent of foot pedal travel for a number of gear ratios in intermediate speed ranges. The line 104 has a slope that is different from the slope of the line 104 of FIG. 5. More particularly, the slope is steeper and results in a greater pressure be directed from the manual modulation valve 42 when the transmission 16 is being operated in the intermediate gear ratios.

FIG. 7 illustrates a chart that represents the pressure versus percent of foot pedal travel when the transmission is being operated in the higher gear ratios. The lines of this chart also have the same element numbers of the lines in FIG. 4. From a review of this chart, it is recognized that upon initial release of a depressed foot pedal the pressure level of the fluid being directed from the manual modulation valve 42 is higher than that set forth in either FIG. 5 or FIG. 6.

INDUSTRIAL APPLICABILITY

During the operation of the machine 10 incorporating the subject invention, the transmission 16 provides a more predictable response through the full range of gear ratios relative to foot pedal displacement. The subject control eliminates the harsh shift/jerk which many times happens in previous systems during shifting in different gear ratios at different foot pedal percentages.

The foot pedal 36 is used to control the power being transmitted to the wheels of the machine 10. If the pedal is fully depressed, no power is delivered to the wheels. As the foot pedal 36 is being released, the power to the wheels is increased. In many work applications, the force necessary to transmit power is directly related to the gear ratio that the transmission 16 is in at the time.

The chart illustrated in FIG. 4 shows a pressure verses percent of foot pedal travel that is generally workable in all of the gear ratios. However, since the loads vary depending on the gear ratio that the transmission is in, it is more practical to provide a different chart for each of the gear ratios or at least have a different chart for selected groups of gear ratios.

FIGS. 5, 6 & 7 illustrated a different chart for different sets of gear ratios. In order to provide the different charts, the controller must be able to control the manual modulation valve 42 in direct relationship to the operating gear ratio. The subject control arrangement makes it possible to provide a different-chart for several different gear ratios or sets of gear ratios. Consequently, the problem of harsh shifts is substantially eliminated and likewise, a more predictable response of the machine is achieved during the changing from one gear ratio to another.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications and that such changes do not depart from the true spirit and scope of the invention.

I claim:

1. A gear dependent control arrangement adapted for use in a machine having a source of pressurized fluid, a shift lever movable to various positions and operative to provide a signal representative of the desired gear ratio, a transmission with a plurality of fluid actuated clutches, and a transmission control system having a solenoid operated pressure modulation valve disposed between each of the clutches and the source of pressurized fluid, the gear dependent control arrangement comprising:

a solenoid actuated manual modulation valve disposed between the source of pressurized fluid and at least certain ones of the plurality of solenoid operated pressure modulation valves;

an operator control mechanism connected to the controller and operative to direct a signal to the controller representative of the position of the operator control mechanism; and a controller operative to receive the signal from the shift lever and control the respective solenoid operated pressure modulation valves to obtain the desired gear ratio to change the magnitude of the pressurized fluid being directed to the certain ones of the solenoid actuated pressure modulation valves from the solenoid actuated manual modulation valve relative to the displacement of the operator control mechanism as a function of the selected gear ratio.

2. The gear dependent control arrangement of claim 1 in combination with a transmission having both directional clutches and speed clutches and the solenoid actuated manual modulation valve is disposed between the source of pressurized fluid and the directional clutches.

3. The gear dependent control arrangement of claim 2 wherein the operator control mechanism is a foot pedal arrangement.

* * * * *